April 29, 1924.
H. E. TOLLIVER
AGRICULTURAL MACHINE
Filed Jan. 31, 1921    2 Sheets-Sheet 1
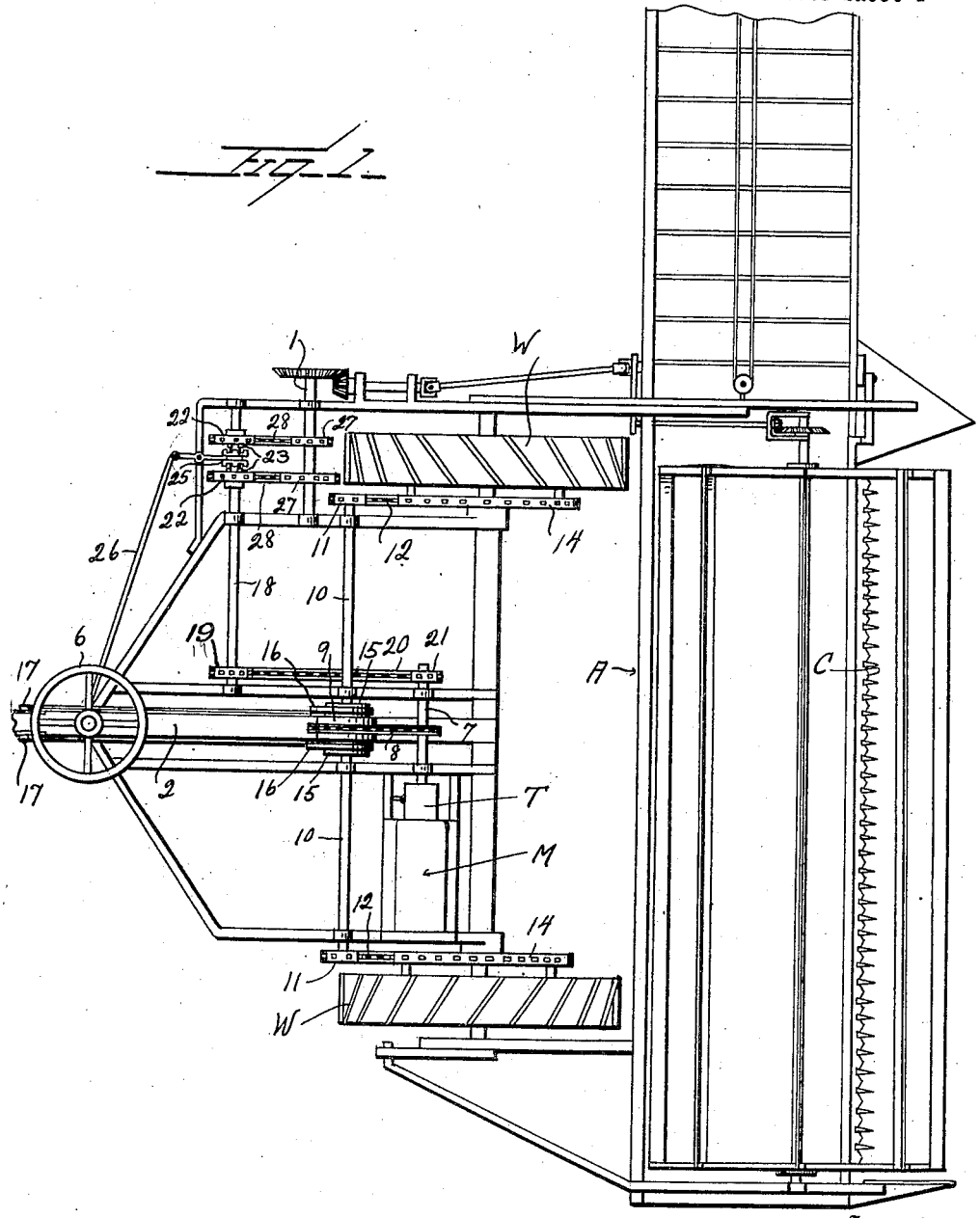
Inventor
H.E. Tolliver
By Watson E. Coleman
Attorney

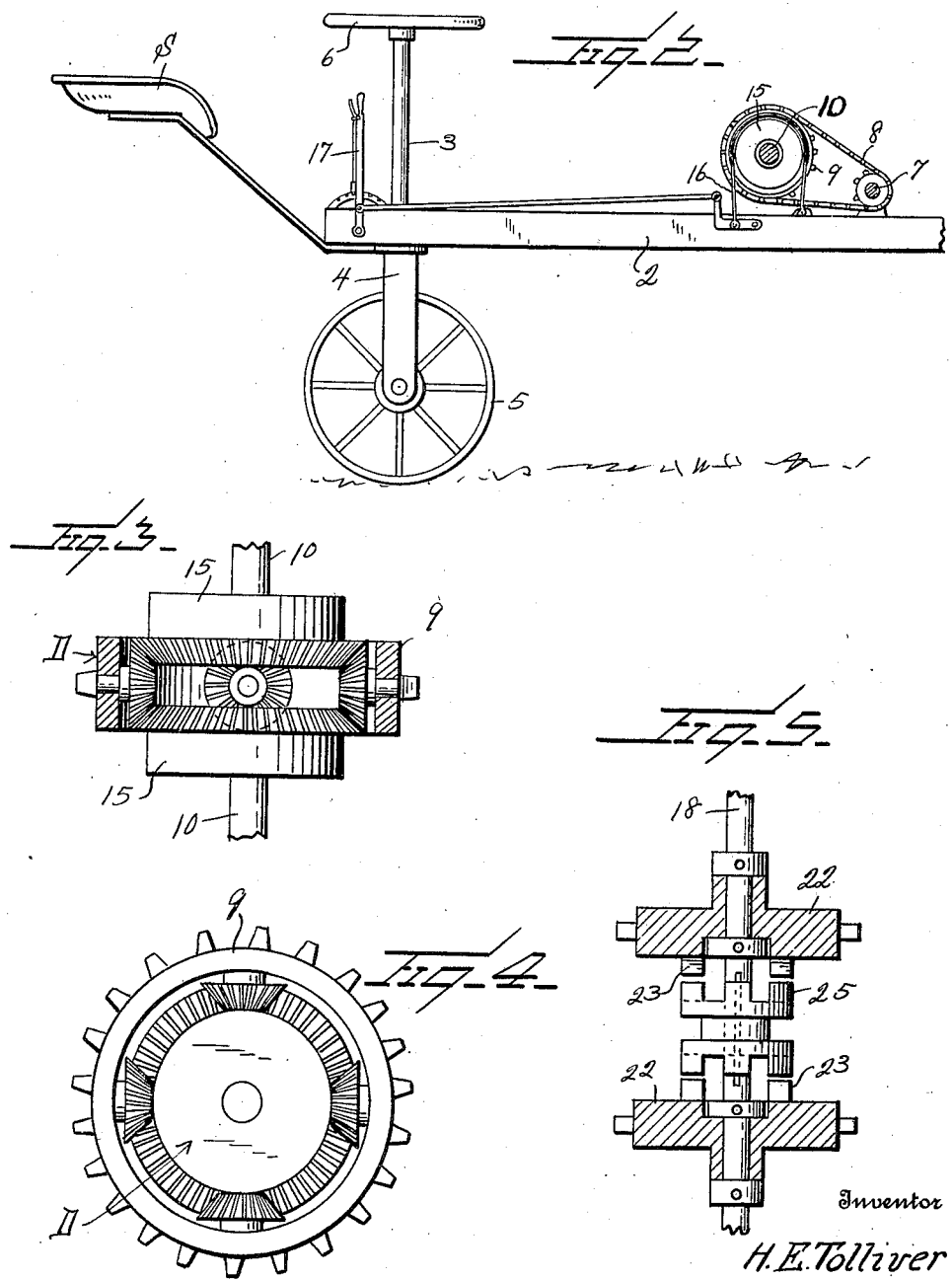

Patented Apr. 29, 1924.

1,492,407

UNITED STATES PATENT OFFICE.

HARRY E. TOLLIVER, OF MANGUM, OKLAHOMA.

AGRICULTURAL MACHINE.

Application filed January 31, 1921. Serial No. 441,322.

*To all whom it may concern:*

Be it known that I, HARRY E. TOLLIVER, a citizen of the United States, residing at Mangum, in the county of Greer and State of Oklahoma, have invented certain new and useful Improvements in Agricultural Machines, of which the following is a specification, reference being had to the accompanying drawings.

This invention relates to certain improvements in agricultural machines, and has relation more particularly to machines of this general character such as push harvesters, binders, and the like, and it is an object of the invention to provide novel and improved means whereby the agricultural machine may be motor driven, together with means whereby a single motor, in addition to providing the tractive power, also serves to operate the mechanism of the machine.

Another object of the invention is to provide a novel and improved mechanism which may be readily and conveniently applied to an agricultural machine of a push type and which mechanism, both as to tractive and mechanical motion, is under the absolute control of a single operator.

It is a particular object of the invention to provide a novel and improved mechanism for use in connection with an agricultural machine of a push type, and which mechanism serves to provide both motive power and power for the mechanism of the agricultural machine and in a manner whereby the speed of operation of the mechanism of the machine may be regulated independently of the tractive speed and particularly so that the machine can take the grain without loss, choke or overload.

Furthermore, it is an object of the invention to provide a novel and improved mechanism for push harvesters or kindred agricultural machines wherein the operation of the machine is under control of a single operator and wherein said operator may readily observe the movements of the machine so that the machine may be prevented from running over and destroying grain, as now occurs in connection with machines of a similar type now generally used.

The invention consists in the details of construction and in the combination and arrangement of the several parts of my improved machine whereby certain important objects and advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating a mechanism constructed in accordance with an embodiment of my invention and in applied position, certain of the parts being in section and the agricultural machine proper being diagrammatically indicated;

Figure 2 is a fragmentary view partly in side elevation and partly in section illustrating certain details of construction as embodied in my improved mechanism as herein disclosed;

Figure 3 is a fragmentary view partly in plan and partly in section of the differential herein embodied;

Figure 4 is a view in side elevation of the structure as illustrated in Figure 3 with a portion omitted;

Figure 5 is a fragmentary view partly in longitudinal section and partly in top plan of the transmission mechanism for coaction with the driving shaft for the mechanism of the agricultural machine.

As disclosed in the accompanying drawings, A denotes an agricultural machine of a push type and which includes a conventional type of cutting mechanism C driven in a conventional manner. The main counter-shaft 1 is rotatively supported by the frame of the machine.

Extending rearwardly from the frame of the machine A is a beam 2, and disposed through the free end portion of the beam 2 is the shank 3 of a fork 4. The fork 4 carries the ground engaging wheel 5 which, upon proper rotation of the shaft 3, provides means whereby the machine may be readily and conveniently steered by the occupant of the seat structure S carried by the beam 2. The upper portion of the shank 3 is provided with a steering wheel 6 which is adapted to be grasped by the operator.

The frame of the machine to one side of the beam 2 supports a motor M, preferably of an internal combustion type, and which motor, through the transmission T, operates a shaft 7. The shaft 7 is in driving connection through the chain 8 with a sprocket ring 9 comprised in a differential D. The differential D cooperates, in a conventional manner, with the aligned shafts 10 extending transversely of the frame F. Each of the shafts 10 is provided with a sprocket 11 around which is disposed a chain 12 which is also directed around a gear 14 operatively connected with a traction wheel W. In view of the foregoing, it will be readily seen that the wheels W may be driven from the motor M or in reverse directions under the instrumentality of the transmission T which is of a conventional type.

It is to be particularly noted that with my improved device two transversely aligned traction wheels are employed with the beam 2 preferably extending rearwardly from the machine at a point substantially midway of the wheels W. Each of the shafts 10 is provided with a brake drum 15 with which coacts a brake band 16. The band 16, as is particularly illustrated in Figure 2, is under control of a lever 17 carried by the beam 2 at a point to be readily grasped by the occupant of the seat S. It is also to be understood that each of the brake straps 16 may be operated one independently of the other.

As the machine is traveling and it is desired to make a turn, it is only necessary to throw one of the bands 16 into gripping action on the coacting drum 15, whereupon a shaft 10 and the traction wheel associated therewith will stop rotating and the machine will make a sharp turn by the tractive force of the second wheel W, with the non-rotating wheel W serving as the turning point. It will also be understood that by proper manipulation of the straps or bands 16 the direction of travel of the machine may be controlled independently of the steering wheel 5 as may be required under certain conditions, but it is preferred that under ordinary conditions the direction of travel of the machine be under the control of the steering wheel 5.

Rotatably supported by the frame of the machine is a counter-shaft 18 in parallelism with the main counter-shaft 1 and the shaft 10. The shaft 18 has fixed thereto a sprocket 19 around which passes a chain 20. The chain 20 also passes around a sprocket wheel 21 carried by the shaft 7 whereby the shaft 18 is in driven connection with the shaft 7. Loosely mounted upon the shaft 18 is a plurality of sprockets 22 provided with the opposed clutch faces 23, with each of which is adapted to separately and selectively interlock a clutch member 25 keyed to the shaft 18 for rotation therewith but having movement longitudinally thereof. As is particularly illustrated in Figure 5, the clutch member 25 is in neutral position but upon requisite movement being imparted to said member 25, either of the sprockets 22 may be caused to rotate in unison with the shaft 18 as desired. Any desired means may be employed for moving the clutch member 25, but such means is generally indicated at 26 in Figure 1 and is so arranged as to be readily and conveniently operated by an occupant of the seat structure S.

Fixed to the main counter-shaft 1 are the sprocket wheels 27 of different diameters each aligned with one of the gears 22, and each pair of aligned gears 22 and 27 are operatively connected by a sprocket chain 28. The gears 22 and 27 and the parts associated therewith provide a transmission mechanism whereby the main counter-shaft 1 may be rotated at different speeds as the occasions of practice may require so that the cutting mechanism C may operate at different speeds. It is of particular advantage to provide this means for varying or regulating the speed of operation of the cutting mechanism C independently of the travel or tractive motion of the machine, as it is of special importance when going into heavier grain that the mechanical speed of the machine proper, and more especially of the cutting mechanism, be increased without increasing the tractive speed. The importance of this provision, and particularly when the agricultural machine constitutes a binder, is because it gives the canvas and tying apparatus speed to take the grain without loss, choke, or overload.

It is also believed to be obvious from the foregoing that with my improved arrangement, the machine at all times is absolutely under control of a single operator, and this in itself is of advantage as it dispenses with the cost of additional persons, as is required with machines now generally in use and wherein a crew of at least three to four men is necessary.

An agricultural machine provided with my improvements has the further advantage of dispensing with the high price tractor or the expensive hitches required in connection therewith.

In the first swathe around the land, the grain stands before the machine and, with a machine equipped with my improvements, when the end of the land is reached, instead of mashing down the grain, the machine is pushed straight to the outer edge of the land, whereupon the motor M is reversed to back up a short distance and whereupon the desired turn at the corner may be readily made without any loss of grain at such corner.

From the foregoing description, it is thought to be obvious that a machine constructed in accordance with an embodiment of my invention is particularly well adapted for use by reason of the convenience and facility with which it may be assembled and operated, and it is also obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. In combination with a harvester having traction wheels, traction operating shafts mounted on the harvester in alignment with each other and operatively connected to the traction wheels, gears carried by the confronting ends of said shafts, a drum projecting from each gear, means engaged with said gears for operatively connecting said shafts to the drive shaft of an engine, said shaft being relatively long and extending in parallel relation to the traction wheel operating shaft, a harvester mechanism driving shaft mounted in spaced parallel relation to one of the traction wheel operating shafts, means connecting said harvested mechanism driving shaft to the drive shaft of the engine, and brake bands engaged with each of the drums of the traction wheel operating shaft to arrest movement of either of said shafts when the harvester is turning, without interfering with the rotation of the drive shaft of the engine or its connection to the actuating means of the traction wheel operating shafts or the harvester mechanism driving shaft.

2. In combination with a harvester having traction wheels, traction wheel operating shafts mounted on the harvester extending in opposite directions substantially in alignment with each other, the confronting ends of said shafts being provided with gears and brake drums, a sprocket band surrounding said gears in spaced relation thereto, transmission gears carried by said band, sprocket teeth carried by the outer face of the band, an engine and engine shaft disposed adjacent the traction wheel operating shafts, said engine shaft extending transversely of the gears and the sprocket band, a sprocket carried by the central portion of the engine shaft, a sprocket chain connecting said sprocket to the sprocket band, a harvester mechanism driving shaft journaled on one side portion of the harvester in parallel relation to the engine shaft and the traction wheel operating shafts, a sprocket wheel carried by the inner end of said harvester mechanism driving shaft, a sprocket carried by the end of the engine shaft, a chain operatively connecting said sprockets, and brake bands carried by the harvester and operable to arrest movement of either of the traction wheel operating shafts to facilitate turning of the harvester without interfering with the rotation of the engine shaft or the rotation of the chain transmitting power to the harvester mechanism driving shaft.

3. Power transmitting means for a harvester embodying a harvester having traction wheel operating shafts journaled thereon substantially in alignment with each other, the outer ends of said shafts being provided with means for transmitting power to the traction wheels of said harvester, the inner confronting ends of each shaft being provided with a gear, said gears being spaced from each other, a brake drum projecting from the outer face of each of said gears and surrounding the shaft, a band surrounding said gears in spaced relation thereto, a plurality of bevel gears mounted within the band and adapted to engage said gears, sprocket teeth projecting from the outer face of the band, a sprocket chain surrounding said band and operatively connecting the same to a source of power, and brake bands carried by the harvester and engaged with the brake drum for controlling movement of said shafts.

In testimony whereof I hereunto affix my signature.

HARRY E. TOLLIVER.